Patented Aug. 24, 1937

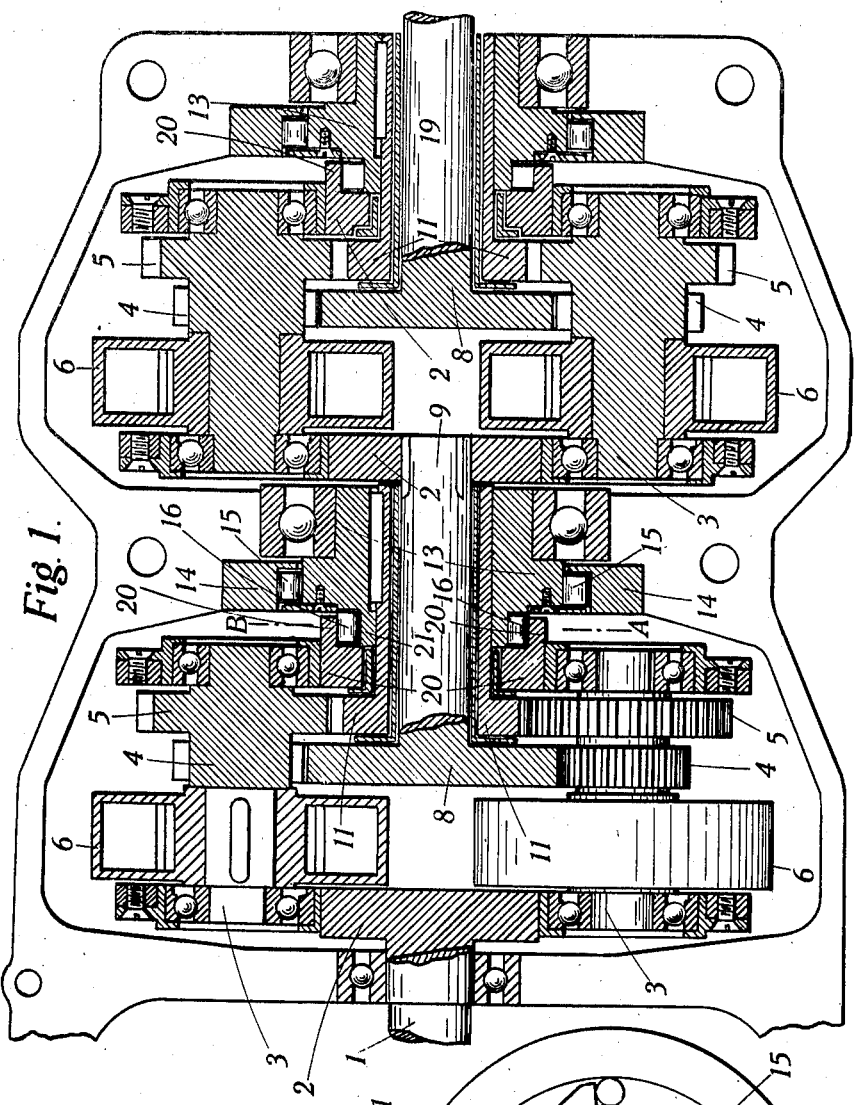
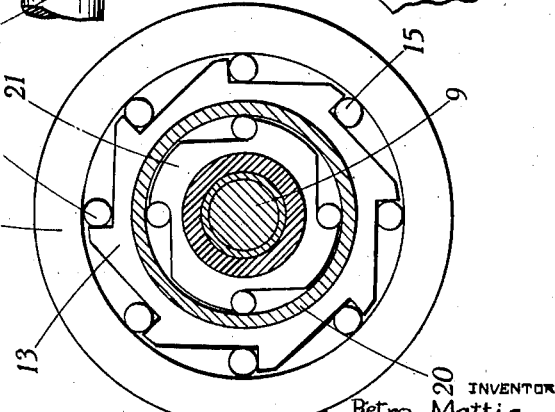

2,091,211

UNITED STATES PATENT OFFICE 2,091,211

CHANGE SPEED MECHANISM

Pietro Mattia, Milan, Italy

Application March 5, 1936, Serial No. 67,340
In Italy March 13, 1935

7 Claims. (Cl. 74—260)

In my patent specification No. 714,484 filed March 7, 1934 I described a change speed mechanism in which couples of planet wheels, mounted on a carrier supported on a power shaft, meshed respectively with a central wheel splined to a driven shaft and with a central wheel provided with a one way clutch mounted on the casing of the mechanism and permitting rotation of the latter mentioned central wheel in the rotating direction of the power shaft, thrusts on said central wheel in the other direction being taken up by the stationary casing.

On the axes of said couples of planet wheels and supported thereon, there was mounted a reservoir, suitably subdivided into compartments and containing mercury or the like high density fluid. As set forth in the principal specification, the said arrangement caused the stepping down of the speed when the centrifugal force acting on the mercury, did not brake the planet wheels. When the said centrifugal force, reached a certain point in respect of the load of the driven shaft, the planet wheels were blocked and the power shaft carried bodily in rotation the driven shaft at equal speed.

In the practical use of the described mechanism it was found that, when the vehicle on which it was mounted, was running downhill, and the driven shaft acted practically as a driving member for the power shaft, the engine connected to the power shaft could no longer exercise its braking action on the driven shaft.

The object of the present invention is to provide the change speed mechanism with means able to maintain a connection between the driven shaft and the power shaft when the former revolves at a greater speed than the power shaft, that is when an extra power acting on the driven shaft causes the latter to act practically as a driving member for the power shaft.

In the annexed drawing is represented by way of example a form of construction of the mechanism as improved according to the present invention.

Fig. 1 shows a middle section of the mechanism as described in the specification No. 714,484 filed March 7, 1934 and provided with the improvements forming the object of the present invention.

Fig. 2 is a cross section on line AB of Fig. 2 showing the details of the one way clutches.

In the annexed drawing like numerals refer to like parts.

A power shaft (1 or 9) is provided with a carrier formed of two discs 2 spaced apart which bear couples of planet wheels 4, 5 integral with one another and mounted on axes 3, on said carrier.

Driven shafts (9 or 19) in alignment with the power shaft (1 or 9) are provided with a central wheel 8 meshing with the small planet wheel 4.

For each driven shaft (9 or 19) there is provided a central wheel 11, meshing with the larger planet wheel 5.

A one way brake is combined with said wheel 11, consisting of a ring 14 fastened to the casing of the mechanism and a ratchet 13 integral to said wheel 11.

Rolls 15 are inserted between said ring 14 and said ratchet 13, while the teeth of said ratchet have a suitable shape and inclination (Fig. 2) to allow the said ratchet and the wheel depending therefrom to rotate freely in the rotating direction of the power shaft (1 or 9) as shown by the arrow in Fig. 2.

The described arrangement shows obviously that, should the driven shaft (9 or 19) rotate in the direction as that indicated by the arrow at a speed greater than that of the power shaft (1 or 9) a loose connection would be maintained between the shafts 1—9; 9—19. In fact the driven shaft 9, meshing through wheel 8 with the planet wheel 4, carries in rotation the planet couples 4, 5, while the latter wheel 5, by meshing with the central wheel 11, rotates freely with the latter, said rotation being that of ratchet 13 depending therefrom, in the direction of the arrow.

According to the present invention and for the purpose above mentioned, a one way clutch is provided which connects the wheel 11 to the power shaft (1 or 9) or any dependent part thereof, when the driven shaft (9 or 19) being driven by an extra power, acts practically as a driving member for the power shaft (1 or 9).

In the described mechanism the carrier may be considered as a part carried by the power shaft (1 or 9) and formed of two discs 2 spaced apart, integral with the power shaft (1 or 9) and bearing the ends of the axes 3. On one of said discs, facing the wheel 11 there is fastened a ring 20 concentric to said wheel 11 and combined with a ratchet 21 carried by the ratchet 13 already mentioned, or from any other part of the wheel 11.

For the purpose of the invention, the ratchet 21 has its teeth provided with an inclination which is the reverse of the inclination given to the teeth of the ratchet 13, as shown clearly in Fig. 2. Owing to the said reverse inclination cooperating with the rollers 16 and with the ring 20, the wheel 11 will be clutched to the carrier 2 when an extra power drives the driven shaft (9, 19) thereby driving the wheel 11 as mentioned above.

I should further mention the reservoir 6 fastened to the couples of planet wheels 4, 5, the construction and function of which is fully described in the principal patent.

Having now particularly described the nature of my invention and the manner in which the same should be performed I claim:

1. In a change speed mechanism, a power shaft and a driven shaft in alignment with one another, a carrier integral with said power shaft, couples of planet wheels of unequal diameter on axes mounted on said carrier, the smaller of said planet wheels meshing with a central wheel fixed to the driven shaft, the larger of said planet wheels meshing with a central wheel mounted on the casing of the mechanism by means of a one way brake which permits rotation of said central wheel in the rotating direction of the shafts, said planet wheels being connected to a reservoir divided into compartments by radial vanes and containing mercury, means including one of the aforementioned parts and a one way clutch to connect the central wheel mounted on the casing with the power shaft, when the latter rotates at a speed smaller than the speed of the driven shaft.

2. A change speed mechanism comprising at least one power shaft and a driven shaft in alignment with one another, a carrier integral with said power shaft and formed of two discs spaced apart, couples of planet wheels of unequal diameter on axes mounted on said carrier between said discs, the smaller of said planet wheels meshing with a central wheel fastened to the driven shaft, the larger of said planet wheels meshing with a central wheel combined with a one way brake which comprises a ring fastened to the casing of the mechanism and a ratchet carried by said central wheel, rollers between said ring and said ratchet, the shape and the inclination of the teeth of said ratchet permitting rotation of the said central wheel in the rotating direction of the power shaft, said planet wheels being connected to reservoirs divided into compartments by radial vanes and containing mercury or the like high density fluid, a one way clutch comprising a ring fastened to the said carrier, a ratchet fastened to the central wheel mounted on the casing, the teeth of the latter mentioned ratchet having shape and inclination suitable to cooperate with rollers in clutching the mentioned central wheel to the carrier, the inclination of the teeth being the reverse of the inclination of the teeth of the first mentioned ratchet.

3. A mechanism of the character described comprising, in combination, a driving shaft, a driven shaft, a carrier fastened to said driving shaft, a toothed wheel secured to said driven shaft, at least one pair of planet wheels of different diameters rigidly operatively connected together and mounted on said carrier and arranged on axes parallel to the said shafts, the smaller of said planet wheels meshing with said toothed wheel on said driven shaft, a central spur wheel mounted for rotation relatively to said shafts and meshing with the larger of said planet wheels, a one-way brake to allow rotation of said spur wheel only in the direction of rotation of the driving shaft, means associated with one of said aforementioned parts for allowing rotation of said spur wheel only at a speed which is not in excess of that of the driving shaft and centrifugally operated means mounted for rotation with the planet wheels adapted to allow planetation of said planet wheels under only certain conditions of operation.

4. A mechanism of the character described comprising, in combination, a driving shaft, a driven shaft, a carrier fastened to said driving shaft, a toothed wheel secured to said driven shaft, at least one pair of planet wheels of different diameters rigidly operatively connected together and mounted on said carrier and arranged on axes parallel to the said shafts, the smaller of said planet wheels meshing with said toothed wheel on said driven shaft, a central spur wheel mounted for rotation relatively to said shafts and meshing with the larger of said planet wheels, a one-way brake to allow rotation of said spur wheel only in the direction of rotation of the driving shaft, means including one of said aforementioned parts for clutching said spur wheel to said driving shaft when said driven shaft tends to drive said driving shaft and centrifugally operated means mounted for rotation with said planet wheels adapted to allow planetation of said planet wheels under only certain conditions of operation.

5. A mechanism of the character described comprising, in combination, a driving shaft, a driven shaft, a carrier fastened to said driving shaft, a toothed wheel secured to said driven shaft, at least one pair of planet wheels of different diameters rigidly operatively connected together and mounted on said carrier and arranged on axes parallel to the said shafts, the smaller of said planet wheels meshing with said toothed wheel on said driven shaft, a central spur wheel mounted for rotation relatively to said shafts and meshing with the larger of said planet wheels, a one-way brake to allow rotation of said spur wheel only in the direction of rotation of the driving shaft, a one-way clutch between one of said parts driven by said driving shaft and said spur wheel to allow rotation of said spur wheel relatively to said part only in the direction opposite to that in which said part rotates, and centrifugally operated means mounted for rotation with said planet wheels adapted to allow planetation of said planet wheels under only certain conditions of operation.

6. A mechanism of the character described comprising, in combination, a driving shaft, a driven shaft, a carrier fastened to said driving shaft, a toothed wheel secured to said driven shaft, at least one pair of planet wheels of different diameters rigidly operatively connected together and mounted on said carrier and arranged on axes parallel to the said shafts, the smaller of said planet wheels meshing with said toothed wheel on said driven shaft, a central spur wheel mounted for rotation relatively to said shafts and meshing with the larger of said planet wheels, a one-way brake to allow rotation of said spur wheel only in the direction of rotation of the driving shaft, a one-way clutch between said carrier and said spur wheel acting oppositely to said previously mentioned one-way brake and centrifugally operated means mounted for rotation with said planet wheels adapted to allow planetation of said planet wheels under only certain conditions of operation.

7. A mechanism of the character described comprising, in combination, a driving shaft, a driven shaft, epicyclic gearing between said driving shaft and said driven shaft, centrifugally operated means rotating with a planet of said epicyclic gearing adapted to allow planetation of said planet only under certain conditions of operation, a toothed wheel mounted for rotation relatively to said driving shaft and said driven shaft and meshing with a planet of said epicyclic gearing, means for preventing rotation of said toothed wheel whereby to form an abutment to enable power to be transmitted from said driving shaft to said driven shaft, and means for allowing rotation of said toothed wheel in the direction of rotation of said driving shaft only at a speed not exceeding that of said driving shaft.

PIETRO MATTIA.